United States Patent [19]

Hill, Jr.

[11] 3,999,697
[45] Dec. 28, 1976

[54] HELI-ARC WIRE FEEDER
[75] Inventor: Gene Hill, Jr., Portsmouth, N.H.
[73] Assignee: The Raymond Lee Organization Inc., a part interest
[22] Filed: July 21, 1975
[21] Appl. No.: 597,553
[52] U.S. Cl. .............................. 226/128; 226/151; 226/158
[51] Int. Cl.² ........................................ B65H 17/36
[58] Field of Search .......... 226/127, 128, 147, 151, 226/158

[56] References Cited
UNITED STATES PATENTS

| | | | |
|---|---|---|---|
| 1,851,420 | 3/1932 | Carson | 226/127 X |
| 3,356,273 | 12/1967 | Wallace | 226/128 |

Primary Examiner—Richard A. Schacher

[57] ABSTRACT

A loop surrounds the user's index finger, and a movable feeder moves back and forth as the user's finger and thumb are squeezed together and released. A fixed feeder is mounted at the vertex of two springs that bias the loops outwardly, the fixed feeder being located behind the movable feeder. The feeders are so designed that when wire is passed through the feeders, the wire will be advanced forwardly as the fingers are squeezed together and released.

4 Claims, 3 Drawing Figures

U.S. Patent    Dec. 28, 1976    3,999,697
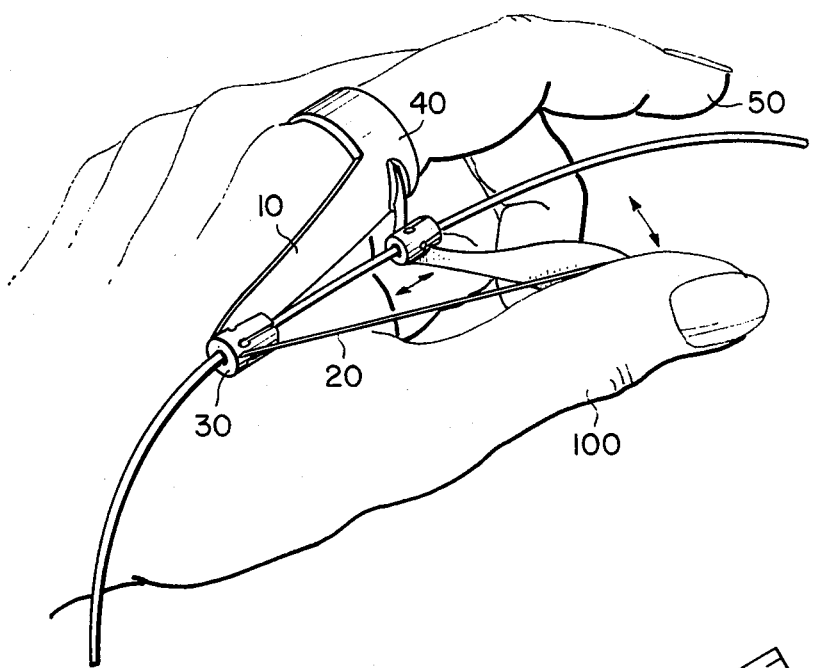
FIG.1
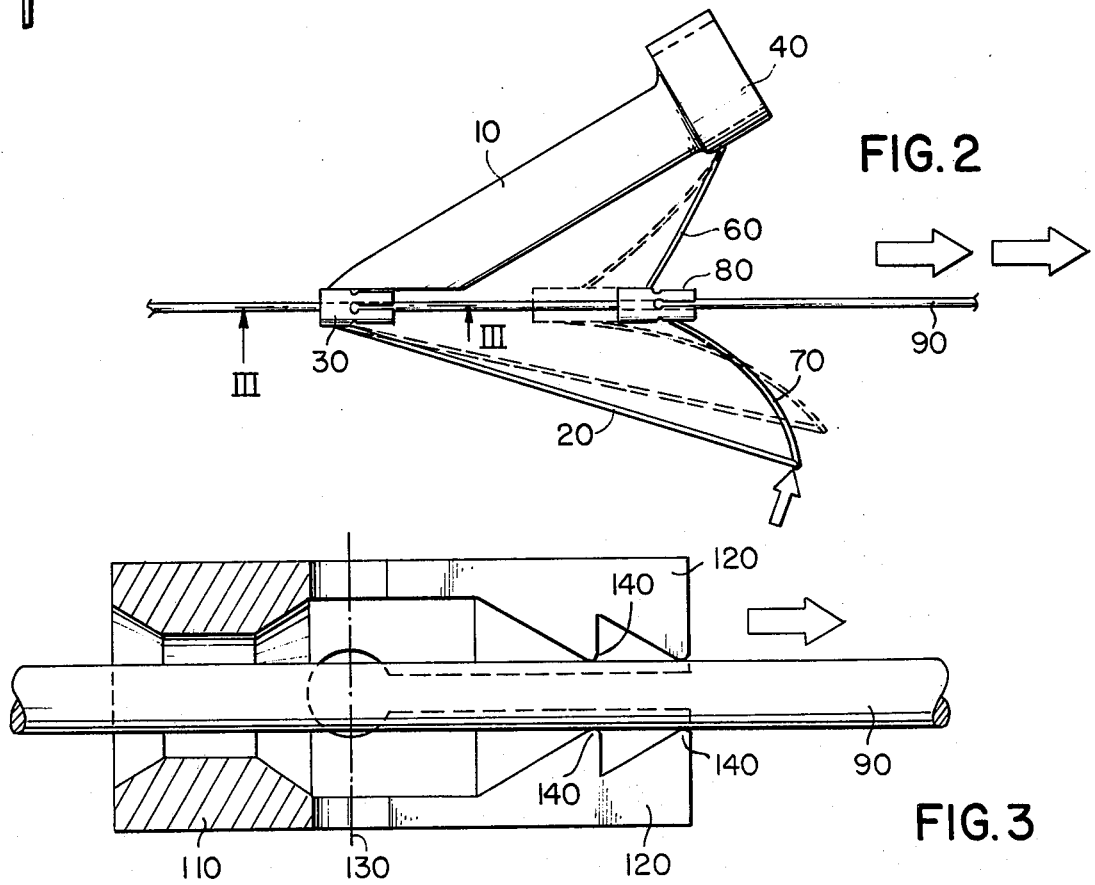
FIG.2
FIG.3

HELI-ARC WIRE FEEDER

SUMMARY OF THE INVENTION

The need exists for a device that will feed heli-arc wire to the location of the welded work. It is desirable that the device be operable by squeezing the thumb and index finger of the welder'free hand together, while permitting the welder to use the other hand for guiding the welding torch.

In this device, the wire is passed through two feeders, which are located one in front of the other. Each feeder is designed to offer less functional drag on a wire passing forwardly through it than on a wire travelling in the opposite direction. Thus, if wire is passed through both feeders and the forward one is moved back and forth with the rear one kept fixed, the net frictional effect will be to advance the wire more than it is pushed back, and thereby produce a net forward motion of the wire.

To this end, the user's index finger and thumb are connected by springs that bias them outwardly. The springs support a fixed rear feeder. Forward of the fixed feeder and connected to finger and thumb is a like movable feeder that is moved forwardly and rearwardly with respect to the fixed feeder by moving the fingers and together, respectively. Wire passing through the two feeders will thus be advanced forwardly, between the thumb and index finger, as those fingers move the springs apart and together.

BRIEF DESCRIPTION OF THE DRAWINGS

FIG. 1 shows the invention in use.
FIG. 2 shows the invention in two positions, demonstrating how it operates.
FIG. 3 is a cross-sectional view of one of the feeders.

DETAILED DESCRIPTION OF THE PREFERRED EMBODIMENT

A leaf spring 10 and a wire spring 20 extend inwardly and rearwardly towards each other to form a V. At the vertex of the U is joined a stationary plastic feeder 30. The front end of leaf spring 10 is connected to an adjustable loop 40 that can be placed around the index finger 50 of a user's hand. Two elongated, flexible arms 60 and 70 are connected at their rear ends to a like movable feeder 80. They extend forwardly and outwardly from the feeder 80, arm 60 being connected to the loop at its forward end and the forward end of arm 70 being connected to the forward end of leaf spring 20. As can be seen in FIG. 2, a heli-arc welding wire 90 is passed forwardly through the stationary feeder and then forwardly through the movable feeder. As the user's thumb 100 presses spring 20 towards the loop, the movable feeder is pushed rearwardly, towards the stationary feeder. Separating the thumb and index finger separates the feeders. As will be later shown, the feeders are constructed so as to produce less frictional drag on wire that is passing forwardly through them than on wire that is passing rearwardly through them. Thus, the net effect of the back and forth motion of the movable feeder is movement of the wire along the direction of less resistance, i.e. forwardly.

Each feeder is generally cylindrical, and has an axial bore through which the wire passes. The rear portion 110 of each feeder is rigid. However, the front portion of each feeder has a plurality of like jaws 120 that are circumaxially located about the axis of the feeder. Each jaw can flex radially inwardly or outwardly, because the portion 130 of the integral casting where each jaw is attached to the rear portion is thinner than the rest of the casting. The jaws are biased inwardly, so that the inner teeth 140 of each jaw press against the wire.

As the wire moves forwardly with respect to the feeder, or if the feeder moves rearwardly with respect to the wire, the jaws can flex slightly outwardly, decreasing the mutual pressure between the wire and the jaws and reducing the friction between them. Conversely, relative motion in the opposite sense tends to flex the jaws inwardly, thereby increasing the friction between the jaws and wire. Therefore, as mentioned before, the frictional drag exerted by the feeders upon the wire is less when the wire is moving forward with respect to the feeders than in the opposite direction.

I claim:

1. A device for feeding heli-arc wire to the welded work by movement of the user's thumb and index finger, comprising:
    an index finger loop for encircling the user's index finger;
    two outwardly biased springs, one spring being attached at its forward end to the loop, both springs extending inwardly and rearwardly to form a V;
    a stationary feeder joined at the vertex of the V formed by the springs, the stationary feeder having an axial bore through which heli-arc wire may be passed and acting on the wire to produce a predetermined frictional drag upon wire passed forwardly through it and a larger frictional drag upon wire passed rearwardly through it;
    a movable feeder located forwardly of the fixed feeder; and
    two flexible elongated arms, one arm being secured at its forward end to the loop, the other arm being secured at its forward end to the forward end of the corresponding spring, and both arms extending rearward and inwardly to the movable feeder, whereby the movable feeder will be moved rearwardly and forwardly in response to inward and outward motions of the thumb and index finger, with the fixed feeder remaining stationary.

2. The device of claim 1 wherein each feeder is cylindrical in shape and has a plurality of like, inwardly biased jaws being circumaxially located around the axial base of the feeder.

3. The device of claim 2 wherein the loop is of adjustable size to accommodate differently sized fingers.

4. The device of claim 3 wherein one spring is a leaf spring and the other spring is a wire spring.

* * * * *